(12) United States Patent
Chiang et al.

(10) Patent No.: US 6,370,642 B1
(45) Date of Patent: Apr. 9, 2002

(54) PROGRAMMING THE SIZE OF A BROAD-SPECIFIC BOOT ROM

(75) Inventors: John M. Chiang, San Jose; Ching Yu, Santa Clara, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/316,180

(22) Filed: May 21, 1999

(51) Int. Cl.$^7$ .................................................. G06F 9/00
(52) U.S. Cl. .............................. 713/1; 713/100; 710/13; 711/103; 711/172
(58) Field of Search .................................. 711/103, 172; 710/13, 14, 104, 306, 311; 713/1, 2, 100; 709/250

(56) References Cited

U.S. PATENT DOCUMENTS

| | | | | |
|---|---|---|---|---|
| 5,091,971 A | * | 2/1992 | Ward et al. | 358/461 |
| 5,506,970 A | * | 4/1996 | Wozniak | 710/113 |
| 6,081,865 A | * | 6/2000 | Tavallaei et al. | 710/309 |

* cited by examiner

Primary Examiner—Hiep T. Nguyen

(57) ABSTRACT

A system is provided to support programming the size of a board-specific boot ROM in an embedded control system. Depending on functions performed by the embedded control system, a manufacturer decides which storage size of the boot ROM is required. An EEPROM of the embedded system is programmed to represent the selected boot ROM size. A network interface that provides data communications between the embedded control system and a data network has a boot ROM size detection circuit that supports boot ROM size programming. The boot ROM size detection circuit includes a ROM range register programmable from the EEPROM, and a boot ROM base address register programmable by an embedded controller via a PCI bus. During a power up process, the boot ROM size data from the EEPROM are loaded into the ROM range register. The embedded controller writes a predetermined value into the boot ROM base address register so as to read information representing the selected boot ROM size. Based on this information, the embedded controller assigns memory addresses in the network interface for the boot ROM of the selected size.

14 Claims, 3 Drawing Sheets

PROGRAMMING THE SIZE OF A BROAD-SPECIFIC BOOT ROM

FIELD OF THE INVENTION

The present invention relates to data processing, and more specifically, to a system that allows the size of a board-specific boot ROM to be programmed.

BACKGROUND OF THE INVENTION

When a user turns on the power of a data processing system, such as an embedded control system, the hardware automatically resets to begin the process of booting. The reset signal goes to all programmable circuits. In response, these circuits initialize certain essential registers, such as system configuration registers, to place the system into a known state, from which system applications may be executed. A boot read-only memory (ROM) is used to store boot data that enable the system to perform booting. The size of the boot ROM is selected to provide a sufficient space for storing boot data.

In an embedded control system, the size of a boot ROM depends on the complexity of operations to be performed by the system. A 2-Kbyte boot ROM may be sufficient for a simple embedded control system, while more complex embedded control systems require larger boot ROMs having up to 16 Mbytes of storage capacity.

To reduce the cost of a system, a manufacturer or vendor should keep the size of a boot ROM at the minimum level sufficient to support a specific embedded control system. However, different system configurations may require different sizes of the boot ROM.

Therefore, to accommodate various system configurations, it would be desirable to provide a system that allows the size of a boot ROM to be programmed during a set up procedure, depending on system applications. As a result, various system configurations would be possible using the same chip. Also, it would be possible to dynamically change the system configuration without changing the circuit design.

DISCLOSURE OF THE INVENTION

Accordingly, one advantage of the invention is in providing a circuit that allows the size of a boot ROM in an embedded system to be programmed during a set up procedure.

Another advantage of the invention is in providing a network interface that would accommodate various configurations of an embedded system using the same chip.

A further advantage of the invention is in providing a network controller that allows configurations of an embedded system to be dynamically changed without changing the design of the network controller.

These and other advantages of the present invention are achieved at least in part by providing a data communications device for supporting interface between communications media and an embedded system that has an embedded controller, an extension ROM, and an EEPROM programmable with ROM size data representing a selected size of the extension ROM. The communications device has a bus interface for providing interface with the embedded controller via a data bus, and an EEPROM interface for providing interface with the EEPROM. A ROM range register is coupled to the EEPROM interface for receiving the ROM size data from the EEPROM. A ROM base address register is coupled to the bus interface for receiving a predetermined value from the embedded controller. A logic circuit is coupled to the ROM range register and the ROM base address register for performing a logic operation on their values. In response to an output value of the logic circuit, the embedded controller determines the selected size of the extended ROM. For example, the extended ROM may comprise a boot ROM for storing data required for booting the embedded system.

In accordance with one aspect of the invention, the ROM range register may be loaded by the ROM size data during a power up procedure. If the EEPROM is absent, the ROM range register remains at its default value. If the extended ROM is absent, the ROM range register receives preset ROM size data from the EEPROM indicating that the size of the extended ROM is equal to 0.

In accordance with a method of the present invention the following steps are carried out to program the size of the extended ROM:

- programming the EEPROM with ROM size data representing the size of the extended ROM selected in accordance with system requirements,
- loading the ROM range register with the ROM size data from the EEPROM,
- writing a predetermined value into the ROM base address register,
- performing a logic operation on values held in the ROM range register and the ROM base address register to produce a ROM size value representing the selected size of the extended ROM, and
- providing the embedded controller with the produced ROM size value.

In accordance with another aspect of the invention, a data processing system comprises a network interface device, an embedded controller, an extended ROM, and an EEPROM programmable with ROM size data representing the size of the extended ROM selected in accordance with system requirements. The network interface device has a first register coupled to the EEPROM for receiving the ROM size data, a second register coupled to the embedded controller for receiving a predetermined value, and a logic circuit for performing a logic operation on values held in the first and second registers for producing an output value indicating the selected size of the extended ROM. The output value may be supplied to the embedded controller to assign in the network interface a memory space sufficient for holding information from the extended ROM of the selected size.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Although the invention has general applicability in the field of data processing, the best mode for practicing the invention is based in part on the realization of a network interface in a packet switched network, such as an Ethernet (IEEE 802.3) network.

Figure 1:
FIG. 1 is a block diagram of an exemplary network interface, in which the present invention may be implemented.
Figure 1A:
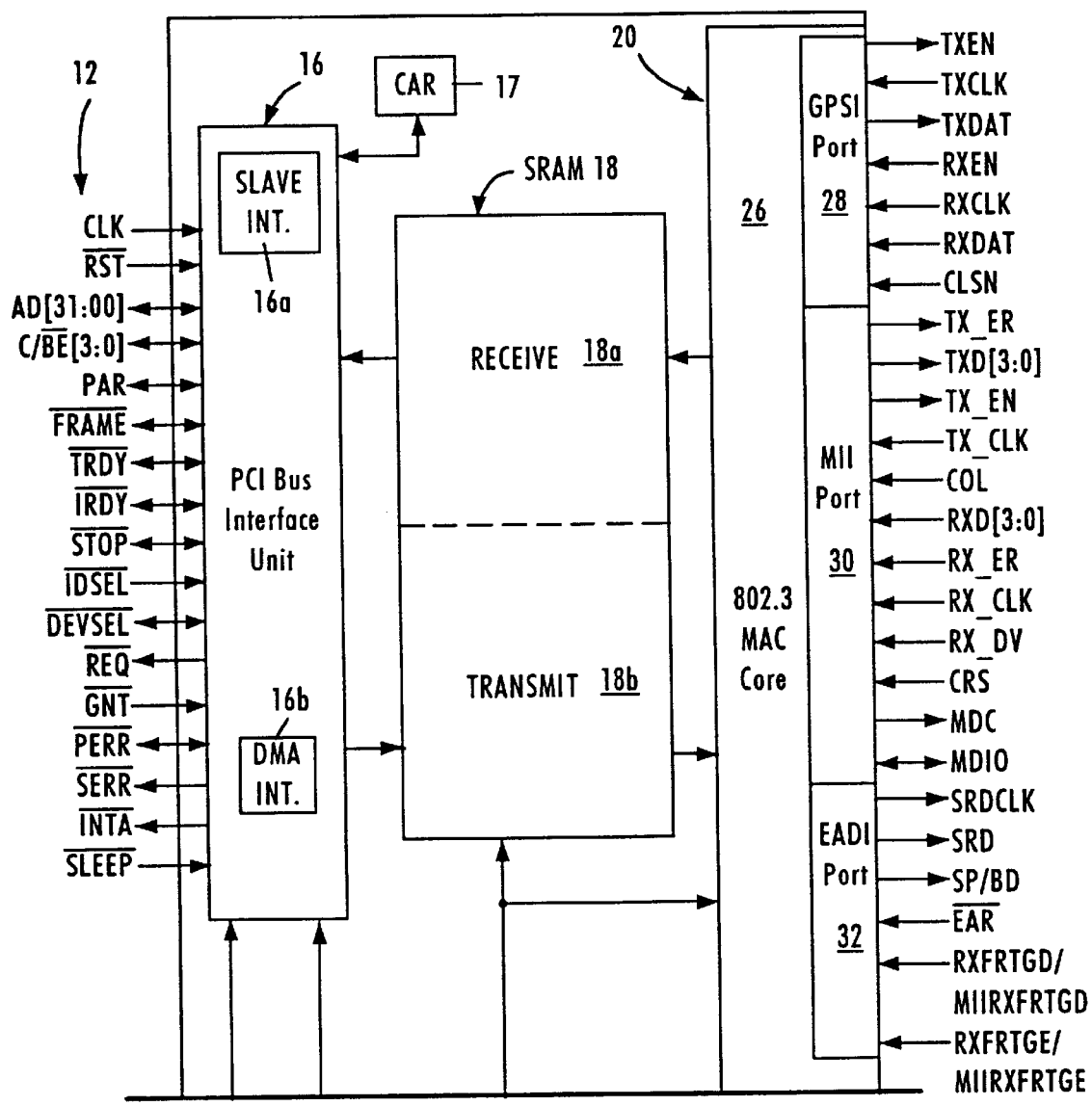
Figure 1B:
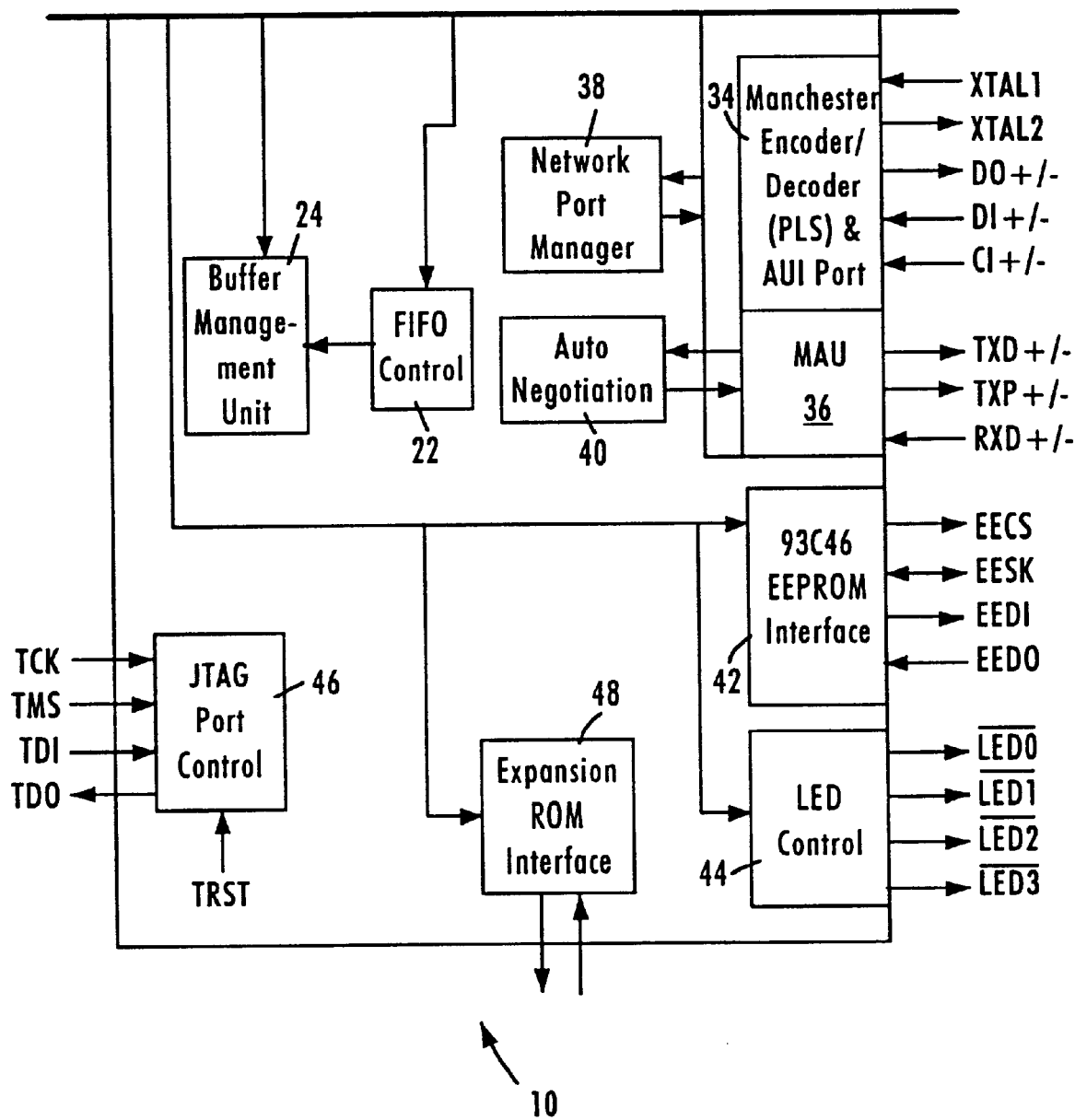

FIG. 1 is a block diagram of an exemplary network interface 10 that accesses the media of an Ethernet (ANSI/IEEE 802.3) network. The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 may provide an interface with an external CPU or other host via the PCI local bus. The PCI bus interface unit 16 may include a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

In accordance with the PCI local bus specification, revision 2.1, the PCI bus interface unit 16 has an interrupt request output INTA/ used for supplying the CPU or a host with an interrupt request signal. The network interface 10 produces the interrupt request signal to indicate that one or more of status flags are set. The status flags may represent such events as receive or transmit interrupt, system error, user interrupt, etc.

A control and register (CAR) block 17 is interfaced to the PCI bus interface 16 to allow read and write accesses to various registers in the network interface 10. The CAR block 17 contains a command register which decodes commands and send command signals to other blocks of the interface 10.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

An auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The network interface 10 also includes an EEPROM interface 42, an LED controller 44, a scan test access port interface 46, and an expansion ROM interface 48.

The EEPROM interface 42 is coupled to the PCI bus interface unit 16 to support direct interface with an external EEPROM. The EEPROM (not shown in FIG. 1) may be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

The LED controller 44 selectively controls the generation of LED output signals based upon the internal decoding logic and network interface status registers (not shown). The IEEE 1149.1-compliant JTAG boundary scan test access port interface 46 supports a scan test procedure.

The expansion ROM interface 48 coupled to the PCI bus interface unit 16 has address, data and control input/outputs to support a direct interface with an external expansion ROM. For example, a boot ROM may be connected via the expansion ROM interface 48.

Figure 2:
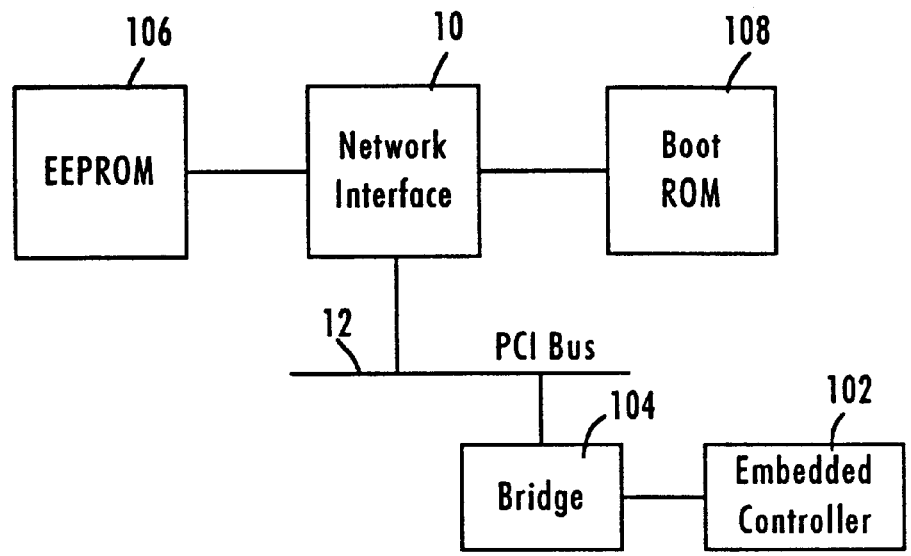
FIG. 2 is a block diagram of an embedded system of the present invention.

FIG. 2 illustrates the application of the network interface 10 in an embedded control system 100, which comprises an embedded controller 102 coupled to the PCI bus 12 via a bridge 104. For example, the embedded controller 102 may be employed in instrument systems, such as machine tools, process controllers, measuring instruments, etc.

The embedded control system 100 may comprise an EEPROM 106 coupled to the network interface 10 via the EEPROM interface 42, and a boot ROM 108 connected to the network interface 10 via the expansion ROM interface 48. For example, the EEPROM 106 and the boot ROM 108 may be arranged on the same board as the embedded controller 102, bridge 104 and the network interface 10.

Conventionally, the size of the boot ROM 108 is substantially larger than the size of the EEPROM 106. For example, the EEPROM 106 may contain 265 words of data, whereas the size of the boot ROM 108 may be from 2 Kbytes to 16 Mbytes depending on the system application. In some embedded control systems, only one of the memory devices 106 and 108 may be employed, whereas some systems may be arranged without both of the memory devices 106 and 108.

To accommodate various configurations of an embedded control system, the present invention allows the size of the boot ROM 108 to be programmed using the EEPROM 106. For example, the manufacturer or vendor of the embedded control system during a manufacture set-up procedure may perform this programming. Depending on functions to be performed by a specific embedded control system, the manufacturer may decide which size of the boot ROM 108 is required, and use a ROM chip having the required storage capacity. The EEPROM 106 is programmed with information indicating the size of the boot ROM 108. As will be discussed in more detail later, the network interface 10 of the present invention determines the boot ROM size information during a power up initialization procedure, when the EEPROM content is loaded into the network interface 10. As a result, the network interface 10 is able to support interface with an embedded control system having a boot ROM of any size. Thus, various system configurations can be provided using the same chip. Also, programming of the boot ROM size allows the system configuration to be dynamically changed without changing the circuit design.

Figure 3:
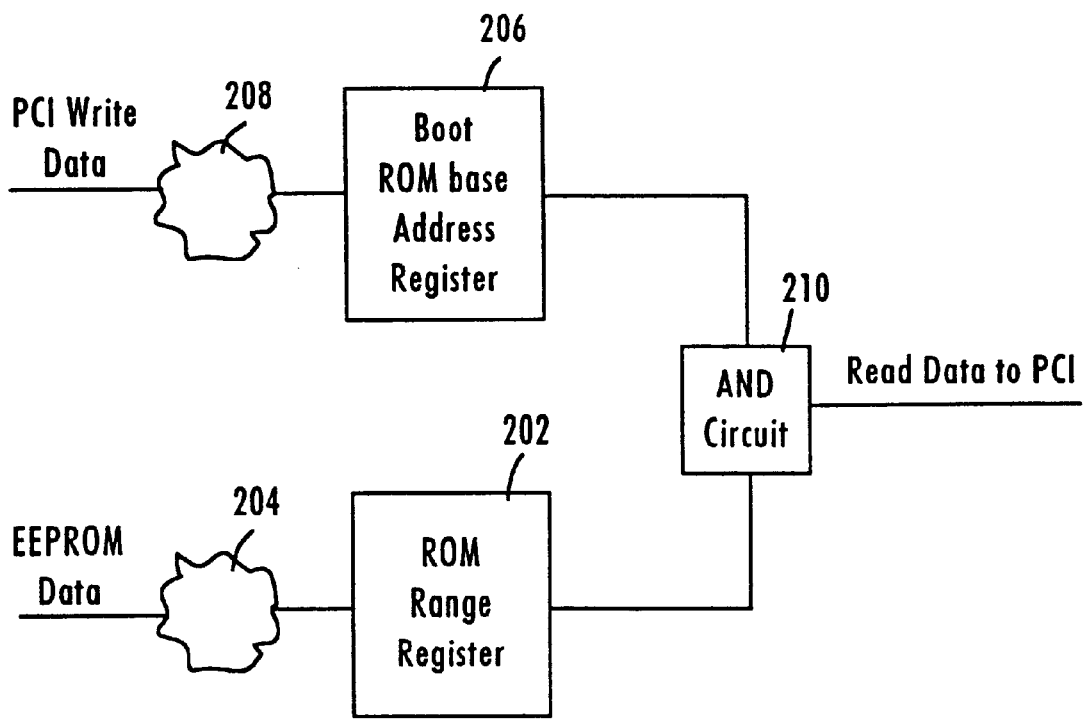
FIG. 3 is a block diagram of a boot ROM size detection circuit in the network interface.

Referring to FIG. 3, the network interface 10 comprises a boot ROM size detection circuit 200 that supports programming of the boot ROM size. The boot ROM size detection circuit 200 includes a ROM range register 202 coupled via control circuitry 204 to the EEPROM interface 42, and a boot ROM base address register 206 coupled via control circuitry 208 to the PCI bus 12. The ROM range register 202 programmable only through the EEPROM interface 42 holds boot ROM size data loaded from the EEPROM 106. The boot ROM base address register 206 is programmable only by data written via the PCI bus 12 by the embedded controller 102.

An AND circuit 210 is coupled to outputs of the ROM range register 202 and the boot ROM base address register 206 to perform an AND operation on values held in the registers 202 and 206. The AND value produced by the AND circuit 210 is read by the embedded controller 102 via the PCI bus 12. For example, the boot ROM size detection circuit 200 may be arranged in the PCI bus interface unit 16.

As discussed above, during a manufacture set-up process, the EEPROM 106 of the embedded control system 100 is programmed with data indicating the size of the boot ROM 108. During a network interface power up initialization procedure, the EEPROM content is loaded into the network interface 10. In particular, the boot ROM size data are loaded from the EEPROM 106 into the ROM range register 202. If the EEPROM 106 is not used in the embedded system 100, the ROM range register 202 will hold a 32-bit default value. For example, bits [31:20] of the ROM range register default value are equal to 1111_1111_1111b, bits [19:11] are set to 0000_0000_0b, and bit 0 is set to 1. The default value of the boot ROM base address register 206 may be represented by bits [31:20] set to 0000_0000_0000b, bits [19:11] equal to 0000_0000_0b, and bit 0 set to 0. Bits [10:1] of the ROM range register 202 and the boot ROM base address register 206 may be reserved for future use.

To determine the boot ROM size value programmed in the EEPROM 106, the embedded controller 102 writes a predetermined value into the boot ROM base address register 206 via the PCI bus 12. For example, the embedded controller 102 may write FFFF_FFFFh into the boot ROM base address register 206. Then, the embedded controller 102 reads the AND value produced by the AND circuit 210 to decode the size of the boot ROM 108 and to enable access to the boot ROM 108.

If the network interface 10 detects that the EEPROM 106 is absent, the ROM range register 202 remains at its default value. When the embedded controller 102 needs to determine the size of the boot ROM 108, it writes FFFF_FFFFh to the boot ROM base address register 206. The AND circuit 210 produces the AND value of the registers 202 and 206 equal to FFF0_0000h. This value indicates that the size of the boot ROM size is equal to 1 Mbytes. The embedded controller 102 reads the AND value via the PCI bus 12, and controls the network interface 10 to assign valid memory addresses to the boot ROM having size equal to 1 Mbytes. Also, the embedded controller 102 may set a boot ROM enable bit ROM_EN to 1 to enable access to the boot ROM 108. For example, the ROM_EN bit may be provided in one of PCI configuration registers arranged in the PCI bus interface unit 16.

If the embedded system contains the EEPROM 106 but the boot ROM 108 is absent, the EEPROM 106 may be programmed to indicate that the boot ROM size is equal to 0. In this case, the ROM range register 202 will be programmed by the EEPROM data to indicate to the embedded controller 102 that the boot ROM size is equal to 0. In response, the embedded controller 102 resets the boot ROM enable bit ROM_EN to prevent access to the boot ROM 108.

If both the EEPROM 106 and boot ROM 108 are present in the embedded system 100, the EEPROM 106 is programmed to represent the real size of the boot ROM 108 used in the embedded system 100. The EEPROM 106 may be programmed to represent the boot ROM size from 2 Kbytes to 16 Mbytes.

For example, if the boot ROM size is 256 Kbytes, the EEPROM 106 may contain bits [31:11] equal to 1111_1111_1111_1100_0000_0 and bit 0 equal to 1. During the network power up process, the EEPROM value is loaded into the ROM range register 202. When the embedded controller 102 needs to determine the size of the boot ROM 108, it writes FFFF_FFFFh to the boot ROM base address register 206. The AND circuit 210 produces the AND value of the registers 202 and 206 equal to FFFC_0001h. This value read by the embedded controller 102 indicates that the boot ROM 108 has the size equal to 256 Kbytes. Based on this information, the embedded controller 102 assigns valid memory addresses to the boot RAM. Thus, the embedded controller 102 does not request more memory space than a specific boot ROM actually needs. To enable access to the boot ROM 108, the embedded controller 102 sets the boot ROM enable bit ROM_EN to 1.

Thus, based on the EEPROM value loaded during a network power up process, the boot ROM size detection circuit 200 produces a value indicating the size of the boot ROM 108. This value is transferred to the embedded controller 102 to enable it to assign memory space in the network interface 10 for the required boot ROM size.

There accordingly has been described a system that supports programming the size of a board-specific boot ROM in an embedded control system. Depending on functions performed by the embedded control system, a manufacturer decides which storage size of the boot ROM is required. An EEPROM of the embedded system is programmed to represent the selected boot ROM size. A network interface that provides data communications between the embedded control system and a data network has a boot ROM size detection circuit that supports boot ROM size programming. The boot ROM size detection circuit includes a ROM range register programmable from the EEPROM, and a boot ROM base address register programmable by an embedded controller via a PCI bus. During a power up process, the boot ROM size data from the EEPROM are loaded into the ROM range register. The embedded controller writes a predetermined value into the boot ROM base address register so as to read information representing the selected boot ROM size. Based on this information, the embedded controller assigns memory addresses in the network interface for the boot ROM of the selected size.

As a result, various system configurations may be provided using the same chip. Also, the system configuration can be dynamically changed without changing the circuit design.

In this disclosure, there are shown and described only the preferred embodiments of the invention, but it is to be understood that the invention is capable of changes and modifications within the scope of the inventive concept as expressed herein.

What is claimed is:

1. A data communications device for supporting interface between communications media and an embedded system having an embedded controller, an extension ROM, and an EEPROM programmable with ROM size data representing a selected size of the extension ROM, the communications device comprising:

a bus interface for providing interface with the embedded controller via a data bus, an EEPROM interface for providing interface with the EEPROM, a ROM range register coupled to the EEPROM interface for receiving the ROM size data from the EEPROM, a ROM base address register coupled to the bus interface for receiving a predetermined value from the embedded controller, and a logic circuit coupled to the ROM range register and the ROM base address register for performing a logic operation on their values, the embedded controller being responsive to an output value of the logic circuit for determining the selected size of the extended ROM.

2. The device of claim 1, wherein said logic circuit performs an AND logic operation.

3. The device of claim 1, wherein the extended ROM comprises a boot ROM for storing data require for booting the embedded system.

4. The device of claim 1, wherein the ROM range register is loaded by the ROM size data during a power up procedure.

5. The device of claim 1, wherein the ROM range register remains at its default value when the EEPROM is absent.

6. The device of claim 5, wherein the embedded controller receives preset information on the selected size of the extended ROM when the EEPROM is absent.

7. The device of claim 1, wherein the ROM range register receives preset ROM size data from the EEPROM when the extended ROM is absent.

8. The device of claim 1, wherein the embedded controller reads the output value of the logic circuit via the bus interface.

9. In a data processing system having an embedded controller, an extended ROM and an EEPROM, a method of programming size of the extended ROM, comprising the steps of:

programming the EEPROM with ROM size data representing size of the extended ROM selected in accordance with system requirements, loading a ROM range register with the ROM size data from the EEPROM, writing a predetermined value into a ROM base address register, performing a logic operation on values held in the ROM range register and the ROM base address register to produce a ROM size value representing the selected size of the extended ROM, and providing the embedded controller with the produced ROM size value.

10. The method of claim 9, wherein the ROM size data from the EEPROM are loaded during a system power up procedure.

11. A data processing system, comprising:

an embedded controller, an extended ROM, an EEPROM programmable with ROM size data representing size of the extended ROM selected in accordance with system requirements, and a network interface device having a first register coupled to the EEPROM for receiving the ROM size data, a second register coupled the embedded controller for receiving a predetermined value, and a logic circuit for performing a logic operation on values held in the first and second registers for producing an output value indicating the selected size of the extended ROM.

12. The system of claim 11, wherein the output value is supplied to the embedded controller to assign in the network interface a memory space sufficient for holding information from the extended ROM of the selected size.

13. The system of claim 12, wherein the extended ROM is coupled to the network interface.

14. The system of claim 11, wherein the extended ROM comprises a boot ROM for storing data required for booting the system.

* * * * *